United States Patent

Bauer et al.

(10) Patent No.: US 12,240,056 B2
(45) Date of Patent: Mar. 4, 2025

(54) ULTRASHORT PULSE LASER BUTT WELDING

(71) Applicant: TRUMPF LASER GMBH, Schramberg (DE)

(72) Inventors: Dominik Bauer, Rottweil (DE); Helge Höck, Schramberg (DE); Michael Scharun, Schramberg (DE); Manuel Schindler, Empfingen (DE)

(73) Assignee: TRUMPF LASER GMBH, Schramberg (DE)

( * ) Notice: Subject to any disclaimer, the term of this patent is extended or adjusted under 35 U.S.C. 154(b) by 698 days.

(21) Appl. No.: 17/331,093

(22) Filed: May 26, 2021

(65) Prior Publication Data
US 2021/0276128 A1  Sep. 9, 2021

Related U.S. Application Data

(63) Continuation of application No. PCT/EP2019/080770, filed on Nov. 9, 2019.

(30) Foreign Application Priority Data

Nov. 28, 2018 (DE) .......................... 102018220447.0

(51) Int. Cl.
*B23K 26/26* (2014.01)
*B23K 26/0622* (2014.01)
(Continued)

(52) U.S. Cl.
CPC .......... *B23K 26/26* (2013.01); *B23K 26/0624* (2015.10); *B23K 26/0876* (2013.01); *B23K 2103/54* (2018.08)

(58) Field of Classification Search
CPC .......................... B23K 26/26; B23K 26/0624; B23K 26/0876; B23K 2103/54
(Continued)

(56) References Cited

U.S. PATENT DOCUMENTS 5,250,783 A   10/1993   Nishi et al.
8,314,359 B2  11/2012   Bovatsek et al.
(Continued)

FOREIGN PATENT DOCUMENTS

CN   105246637 A   1/2016
CN   205439250 U   8/2016
(Continued)

OTHER PUBLICATIONS

CN Office Action in Chinese Appln. No. 201980078564.8, dated Apr. 1, 2022, 13 pages (with English translation).
(Continued)

*Primary Examiner* — Eric S Stapleton
*Assistant Examiner* — Yeong Juen Thong
(74) *Attorney, Agent, or Firm* — Fish & Richardson P.C.

(57) ABSTRACT

The present disclosure provides methods, devices, and systems for the butt welding of two, e.g., planar, workpieces composed of glass, e.g., quartz glass, by a pulsed laser beam, e.g., an ultrashort pulse ("USP") laser beam, which is directed into the workpiece material parallel to the joining surface of the two workpieces and which is focused into the workpiece material in the region of the joining surface to locally melt the two workpieces in the region of their joining surface, wherein the laser focus of the laser beam focused into the workpiece material is moved in or counter to the beam direction of the laser beam to produce in the region of the joining surface a weld seam extending along the beam direction.

21 Claims, 3 Drawing Sheets

(51) Int. Cl.
  *B23K 26/08* (2014.01)
  *B23K 103/00* (2006.01)
(58) Field of Classification Search
  USPC .......................... 219/121.63, 121.6, 121.84
  See application file for complete search history.

(56) References Cited

U.S. PATENT DOCUMENTS

| | | | |
|---|---|---|---|
| 9,625,713 B2 | 4/2017 | Helie et al. | |
| 10,300,664 B2* | 5/2019 | Knoll | B29C 66/95 |
| 10,746,937 B2 | 8/2020 | Butler et al. | |
| 11,573,379 B2 | 2/2023 | Fuchs et al. | |
| 2002/0015568 A1 | 2/2002 | Dahmani et al. | |
| 2004/0011773 A1* | 1/2004 | Fritz | B23K 26/03 |
| | | | 219/121.64 |
| 2005/0195402 A1 | 9/2005 | May et al. | |
| 2010/0047587 A1* | 2/2010 | Itoh | B29C 66/43 |
| | | | 428/411.1 |
| 2010/0084384 A1 | 4/2010 | Bovatsek et al. | |
| 2013/0008880 A1* | 1/2013 | Ota | B23K 26/0652 |
| | | | 219/121.64 |
| 2013/0068384 A1* | 3/2013 | Liu | B32B 37/06 |
| | | | 219/121.61 |
| 2013/0245616 A1* | 9/2013 | Alfano | A61B 18/20 |
| | | | 606/3 |
| 2013/0344302 A1* | 12/2013 | Helie | B23K 26/57 |
| | | | 156/272.8 |
| 2014/0291304 A1* | 10/2014 | Mudd, II | B23K 26/20 |
| | | | 219/121.64 |
| 2014/0332157 A1* | 11/2014 | Arai | B29C 66/30322 |
| | | | 156/272.8 |
| 2015/0219860 A1 | 8/2015 | Danley et al. | |
| 2016/0016261 A1* | 1/2016 | Mudd, II | B23K 26/044 |
| | | | 219/121.64 |
| 2016/0067822 A1* | 3/2016 | Arai | B23K 26/083 |
| | | | 65/102 |
| 2016/0207041 A1* | 7/2016 | Weber | B29C 65/16 |
| 2016/0327735 A1 | 11/2016 | Chen et al. | |
| 2016/0368089 A1 | 12/2016 | Grapov et al. | |
| 2017/0297145 A1 | 10/2017 | Hosomi et al. | |
| 2017/0368638 A1 | 12/2017 | Tayebati et al. | |
| 2018/0029919 A1 | 2/2018 | Schnitzler et al. | |
| 2021/0276127 A1 | 9/2021 | Kumkar et al. | |
| 2021/0278603 A1 | 9/2021 | Fuchs et al. | |

FOREIGN PATENT DOCUMENTS

| | | |
|---|---|---|
| CN | 106414037 A | 2/2017 |
| CN | 108372362 A | 8/2018 |
| CN | 108609841 | 10/2018 |
| CN | 113227002 A | 8/2021 |
| DE | 102006042280 | 6/2007 |
| DE | 102007036671 | 1/2009 |
| DE | 102010038554 | 2/2012 |
| DE | 102011081554 | 2/2013 |
| DE | 102013201968 | 8/2014 |
| DE | 102015003652 | 9/2016 |
| DE | 102016116409 | 3/2017 |
| DE | 102017114002 | 12/2018 |
| EP | 0531139 | 3/1993 |
| EP | 0905534 | 3/1999 |
| EP | 2056144 | 5/2009 |
| EP | 2548690 A1 | 1/2013 |
| EP | 2915785 A1 | 9/2015 |
| JP | S63135906 A | 6/1988 |
| JP | 2005-001172 | 1/2005 |
| JP | 2010-070388 | 4/2010 |
| JP | 2014-037006 | 2/2014 |
| JP | 2016-521208 | 7/2016 |
| JP | 2017-068052 | 4/2017 |
| KR | 101453855 | 10/2014 |
| KR | 20150039646 | 4/2015 |
| WO | WO 2020/108960 | 6/2020 |

OTHER PUBLICATIONS

CN Office Action in Chinese Appln. No. 201980078564.8, dated Aug. 26, 2022, 9 pages (with English translation).
CN Office Action in Chinese Appln. No. 201980078566. 7, dated Jul. 26, 2022, 12 pages (with English translation).
US Final Office Action in U.S. Appl. No. 17/331,089, mailed on Nov. 1, 2023, 13 pages.
KR Office Action in Korean Appln. No. 1020217018938, mailed on Jan. 4, 2023, 8 pages (with English translation).
KR Office Action in Korean Appln. No. 1020217018938, mailed on Jul. 14, 2023, 7 pages (with English translation).
KR Office Action in Korean Appln. No. 1020217018938, mailed on Sep. 6, 2022, 8 pages (with English translation).
DE Office Action in German Appln. No. 102018220445.4, dated Feb. 22, 2023, 12 pages (with English translation).
Zhang et al., "Femtosecond laser Bessel beam welding of transparent to non-transparent materials with large focal-position tolerant zone," Optics Express, Jan. 22. 2018, 26(2):917-26.
Bauer, "Invention Submission for Impact Welding of Optics/ Glasses," filed Oct. 13, 2017, 8 pages (with English translation).
CN Office Action in Chinese Appln. No. 201980078620.8, mailed on May 24, 2023, 19 pages (with English translation).
CN Office Action in Chinese Appln. No. 201980078620.8, mailed on Sep. 15, 2023, 14 pages (with English translation).
US Non-Final Office Action in U.S. Appl. No. 17/329,332, dated Jul. 6, 2022, 14 pages.
US Non-Final Office Action in U.S. Appl. No. 17/331,089, dated May 3, 2023, 25 pages.
CN Office Action in Chinese Appln. No. 201980078620.8, dated Aug. 24, 2022, 13 pages (with English translation).
US Final Office Action in U.S. Appl. No. 17/329,332, dated Nov. 2, 2022, 10 pages.
DE Office Action in German Appln. No. 102018220445.4, dated Aug. 27, 2019, 14 pages (with English translation).
DE Office Action in German Appln. No. 102018220447.0, dated Aug. 27, 2019, 17 pages (with English translation).
DE Office Action in German Appln. No. 102018220477.2, dated Nov. 28, 2018, 24 pages (with English translation).
Itoh et al., "Ultrafast processes for bulk modification of transparent materials," MRS Bulletin, Aug. 2006, 31(8):620-5.
PCT International Search Report and Written Opinion in International Appln. No. PCT/EP2019/080770, dated Feb. 18, 2020, 28 pages (with English translation).
PCT International Search Report and Written Opinion in International Appln, No. PCT/EP2019/081441, dated Mar. 4, 2020, 18 pages (with English translation).
PCT International Search Report and Written Opinion in International Appln. No. PCT/EP2019/081787, Feb. 18, 2020, 26 pages (with English translation).
Richter, " Dissertation—Direct laser bonding of transparent materials using ultrashort laser pulses at high repetition rates," Mar. 6, 2014, 123 pages.
US Non-Final Office Action in United States U.S. Appl. No. 17/331,089, mailed on Apr. 1, 2024, 12 pages.
CN Office Action in Chinese Appln. No. 201980078620.8 mailed on Jan. 16, 2024, 8 pages (with English translation).

* cited by examiner

ULTRASHORT PULSE LASER BUTT WELDING

CROSS REFERENCE TO RELATED APPLICATIONS

This application is a continuation of and claims priority under 35 U.S.C. § 120 from PCT Application No. PCT/EP2019/080770, filed on Nov. 9, 2019, which claims priority from German Application No. 10 2018 220 447.0, filed on Nov. 18, 2018. The entire contents of each of these priority applications are incorporated herein by reference.

TECHNICAL FIELD

The present disclosure relates to methods, devices, and systems for the butt welding of two, e.g., planar, workpieces composed of glass, e.g., quartz glass, by using at least one pulsed laser beam, e.g., an ultrashort pulse ("USP") laser beam, which is focused into the workpiece material parallel to the joining surface of the two workpieces and which is focused into the workpiece material in the region of the common joining surface to locally melt the two workpieces in the region of their common joining surface, and also to optical elements joined together from a plurality of individual parts that are laser-welded to one another.

BACKGROUND

USP laser radiation having pulse durations of less than 500 picosecond (ps), e.g., in the femtoseconds range, is increasingly being used for material processing. An advantage of material processing using USP laser radiation resides in the high peak powers/peak intensities of the laser radiation with the workpiece. As a result, extreme thermal imbalances can be produced in the workpiece, e.g., between electrons and atom/ion cores, which then result in unique removal or formation mechanisms.

The laser welding of laser-transparent glasses or other materials that are transparent, partly transparent, or scattering vis-à-vis the laser beam by ultrashort laser pulses creates a stable connection without additional material use, but is limited by laser-induced transient and permanent stresses. For the butt welding of two laser-transparent workpieces, such as glasses or crystals, for example, a USP laser beam focused for example centrally into the volume of the two workpieces is moved along the joining line of the two workpieces to locally melt the two workpieces in the region of their interface and thereby to produce a continuous horizontal weld seam in the material of the two workpieces. The weld seam is formed by a melting zone, which is discernible from outside of the workpieces as a welding bubble and which proceeds from the laser focus and extends in the shape of a drop counter to the direction of the incident laser beam, e.g., tapers to a point at the laser focus on the side facing the laser focus and terminates in hemispherical fashion on the side facing away from the laser focus. To increase the bonding area, a plurality of weld seams are placed next to one another in paths. This known way of welding creates gas-tight weld seams and joining connections having high strengths and is used for joining protective glasses, for example.

SUMMARY

The present disclosure provides butt welding methods, devices, and systems of using ultrashort laser pulses to join together laser-transparent workpieces with minimal optical impairment.

Local melting of the material can be done using ultrashort laser pulses. For example, if ultrashort laser pulses are focused into a volume of glass, e.g., quartz glass, the high intensity present at the laser focus results in non-linear absorption processes, whereby, depending on the laser parameters, different material modifications can be induced. These non-linear absorption processes generate free charge carriers, which in consequence effect quasi-linear absorption. In this way, a plasma arises locally and forms the melting zone. If the modification is positioned in the region of the interface of two glasses, the cooling melt generates a stable connection between both workpieces. Because of the local joining process, the laser-induced stresses are typically low; therefore, even glasses having greatly different thermal properties can be welded together. Moreover, other transparent materials, such as crystals having in some instances even more greatly deviating thermal and mechanical properties, can be welded to one another or to glasses.

In one aspect, the disclosure provides methods in which a laser focus of a laser beam is focused into the workpiece material and is moved in or counter to the beam direction of the laser beam to produce in the region of the joining surface a weld seam extending counter to the beam direction. In some embodiments, the USP laser beam comprises laser radiation having pulse durations of, e.g., less than 50 ps, less than 1 ps, or in the femtoseconds range.

In some embodiments, weld seams can also be produced by means of an advance movement of the laser focus in or counter to the beam direction. The advance movement of the laser focus can be varied, for example, by a movement of the laser processing head in or counter to the beam direction of the laser beam, by an advance movement of an optical fiber and perforated element in or counter to the beam direction of the laser beam, or a change in focal length of the focusing optical unit. The welding can be varied through material that has already been welded beforehand, which can correct incorrect welds. It is also possible to weld curved or slightly curved surfaces with slight movement in the X-direction during Z-welding.

In certain embodiments, the advance movement of the laser focus in or counter to the beam direction is effected continuously, but in other embodiments, the advance movement can also be effected step-by-step with or without pauses between the individual steps. Welding without pauses has the effect that welding occurs in material that is still hot from the preceding step, and welding with pauses has the effect that welding occurs in material that has cooled down due to the temporal delay with respect to the preceding step. As has been shown by experiments, e.g., continuous laser welding counter to the beam direction results in a crack-free continuous weld seam.

In the case of an advance movement counter to beam incidence direction, a continuous advance in the range of, e.g., 0.5 mm/s to 100 mm/s, 5 mm/s to 30 mm/s, or approximately 20 mm/s, is employed.

A weld seam having a seam diameter of, e.g., 5-500 μm, or 50 μm to 100 μm, is produced during the welding.

To increase the tolerance range, a transverse displacement (xy-displacement) of the laser focus is also superimposed on the advance direction of the laser focus in or counter to the radiation direction of the laser beam.

It is possible to employ individual pulses during the welding. For example, pulse packets having a plurality of individual pulses can be employed during the welding. A pulse train consists of many individual pulses, wherein the individual pulses have an individual pulse repetition rate from pulse to pulse. Pulse packets consist of at least two individual pulses. There is also an individual pulse repetition rate. Furthermore, there is also a pulse-packet-to-pulse-packet repetition rate. The individual pulses in a pulse packet can be identical. The number of individual pulses in a pulse packet is, for example, between 2 and 20, e.g., approximately 5. By way of example, the pulse-packet-to-pulse-packet repetition rates can be 50-200 kHz, e.g., approximately 125 kHz, and the average pulse power can be 1-20 W, e.g., approximately 10 W. The individual pulse repetition rate in the pulse packet is typically a plurality of MHz.

The laser beam can be directed obliquely or at right angles onto the workpiece side facing the laser beam. In both cases, the weld seam extends in the thickness direction of the workpieces.

For a reliable joining connection, a plurality of weld seams can be produced at a distance from one another along the joining line of the two workpieces.

In certain embodiments, during the movement of the laser focus in or counter to the beam direction, the laser beam is not moved further relative to the two workpieces. In the case of an advance movement of the laser focus in the beam direction, welding occurs in material that has already been welded beforehand, which, as has been shown by experiments, is possible without any problems.

In other embodiments, during the movement of the laser focus in or counter to the beam direction, the laser beam is moved relative to the two workpieces in an advance direction running parallel or transversely with respect to the joining line of the two workpieces. In this case, the focus speed at which the laser focus is moved in or counter to the beam direction should advantageously be greater than the advance speed at which the laser beam is moved parallel or transversely with respect to the joining line.

The two workpieces can be formed from, e.g., glass, quartz glass, polymer, glass ceramic, crystals, or combinations thereof and/or with opaque materials.

In a further aspect, the present disclosure also relates to optical elements composed of glass, e.g., quartz glass, that are joined together from at least two individual parts by butt welding as described herein, wherein two individual parts are laser-welded to one another by at least one weld seam extending in the thickness direction of the two individual parts. The weld seam can extend at right angles or obliquely with respect to a surface of the optical element and have a length of at least 50 μm, e.g., of at least 1 mm. In this case, the weld seam can be embodied as a continuous line or as an interrupted line consisting of spaced-apart individual spot welds or weld sections. In some embodiments, the weld seam extends almost over the entire workpiece thickness and ends before the two workpiece sides such that no escape of material arises and a clean process is conducted. This depends on the size of the weld seam or welding bubbling. In some embodiments, a plurality of weld seams extending in the thickness direction of the two individual parts are arranged at a distance from one another along the joining line of the two individual parts.

Large optical systems which have been manufactured expensively from a large substrate can now be joined cost-effectively from individual parts that are laser-welded to one another by way of a plurality of vertical weld seams. In contrast to horizontal weld seams, vertical weld seams do not adversely affect the optical system in linear fashion, but rather only in punctiform fashion. The extent of the weld seam in the optical element is small and the risk of a change in the optical properties of the optical system is thus minimized.

DESCRIPTION OF DRAWINGS

Further advantages and advantageous configurations of the subject matter of the invention are evident from the description, the claims and the drawing. Likewise, the features mentioned above and those presented further below can each be used by themselves or as a plurality in any desired combinations. The embodiments shown and described should not be understood as an exhaustive enumeration, but rather are of exemplary character for outlining the invention.

DETAILED DESCRIPTION

Figure 1:
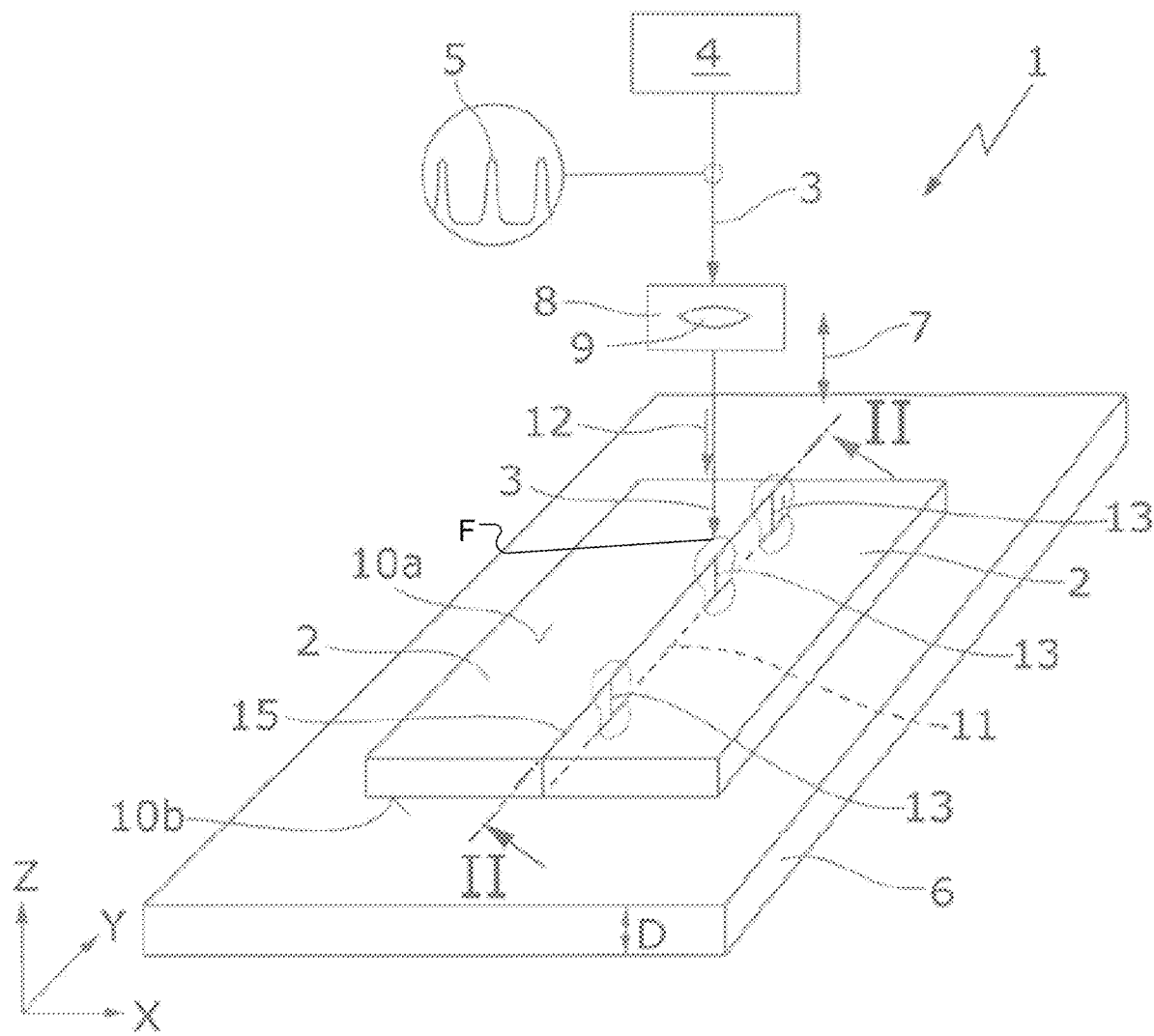
FIG. 1 is a schematic diagram of a laser processing machine for the butt welding of two laser-transparent workpieces together using a laser beam as described herein, one of the two workpieces being illustrated in a cut-away view in the region of vertical weld seams.

The laser processing machine 1 shown in FIG. 1 serves for the butt welding of two planar workpieces 2 bearing against one another in a butt joint, by a laser beam 3. The two workpieces 2 are formed for example from, e.g., glass, quartz glass, polymer, glass ceramic, in crystalline fashion or from combinations thereof and/or with opaque materials.

The laser processing machine 1 includes a USP laser 4 for generating the laser beam 3 in the form of USP laser pulses 5 having pulse durations of less than 10 ps, e.g., in the form of femtosecond pulses, a horizontal workpiece table 6, on which the two workpieces 2 to be welded bear next to one another, and a laser processing head 8, which is movable in X-Y-directions and is height-positionable in the direction of the double-headed arrow 7 and has a focusing optical unit 9 for focusing the laser beam 3 emerging at the bottom of the laser processing head 8. As an alternative or in addition to the laser processing head 8 that is movable in X-Y-directions, the workpiece table 6 can also be moved in X-Y-directions.

During the butt welding of the two workpieces 2, the laser beam 3 is directed at right angles onto the workpiece top side 10a facing the laser processing head 8 and is focused into the workpiece material in the region of the common joining surface 11 of the two workpieces 2 to locally melt the two workpieces 2 in the region of the joining surface 11. In this case, the laser focus F of the laser beam 3 is moved in or counter to the beam direction 12 of the laser beam 3 to produce in the region of the joining surface 11 a vertical weld seam 13 extending in the beam direction 12. In this case, the laser focus F of the focused laser beam 3 is situated at the joining surface 11 or in proximity to said joining surface 11 in the volume of one of the two workpieces 2. Ideally, the process starts before the laser focus F to allow for power tolerances. Butt welding work is in the vicinity of or in very close proximity to the joining surface 11. The vertical weld seam 13 extends almost over the entire workpiece thickness and ends before the workpiece top side and underside 10a, 10b such that no escape of material arises and a clean process is conducted. This depends on the size of the weld seam 13 or the welding bubble. Instead of being directed at right angles to the workpiece top side 10a as in FIG. 1, the laser beam 3 can also be directed obliquely onto the workpiece top side 10a, such that the weld seam produced in the workpiece volume runs obliquely with respect to the workpiece top side 10a (e.g., 450 welding). The workpiece underside 10b of the two workpieces 2 can for example be coated, e.g., with a highly reflective coating. A plurality of vertical weld seams 13 can be produced at a distance from one another along the joining line 15 of the two workpieces. The joining line 15 can also run non-straight, instead of straight as shown in FIG. 1.

Figures 2A, 2B, 2C:
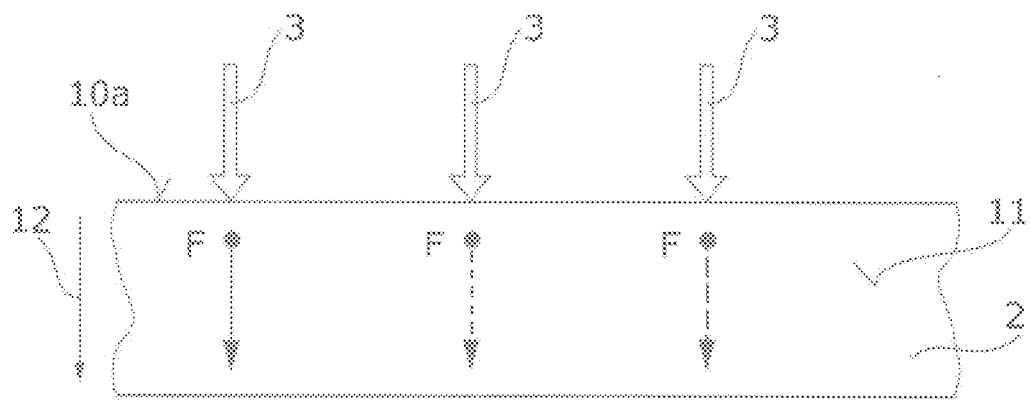
FIGS. 2A-2C are a series of schematic diagrams of a different vertical advance movements of the laser focus in the beam direction of the laser beam during butt welding to produce a weld seam, in a sectional view along the joining surface of the two laser-welded workpieces.

FIGS. 2A-2C schematically show different vertical advance movements of the laser focus F in the workpiece volume in the beam direction 12, wherein during this vertical advance movement of the laser focus F the laser beam 3 is stationary relative to the two workpieces 2. In FIG. 2A the laser focus F is moved in the beam direction 12 continuously (e.g., at a vertical advance speed of 20 mm/s) and in FIGS. 2B and 2C, the laser focus is moved step by step without pauses (FIG. 2B) and with a temporal pause (e.g., 2 seconds) between the steps (FIG. 2C). As shown in FIGS. 2A-2C, the laser beam 3 can impinge on the workpiece top side 10a at right angles or alternatively obliquely.

Figures 3A, 3B, 3C:
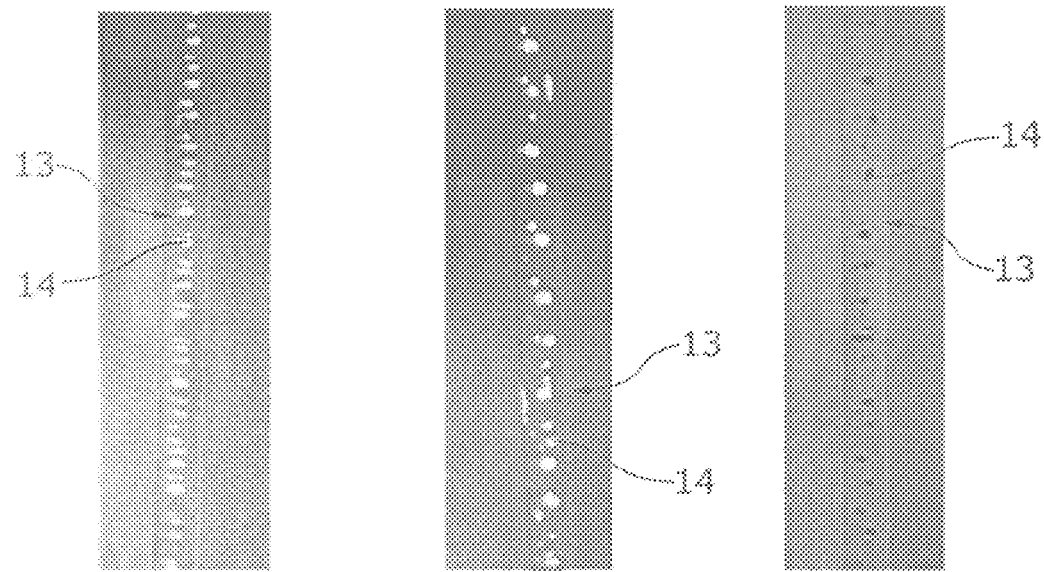
FIGS. 3A-3C are a series of photographs of a vertical weld seams that were produced in a monolithic glass block with the vertical advance movements of the laser focus as shown in FIGS. 2A-2C.

FIGS. 3A-3C are photographs of vertical weld seams 13 produced by the vertical advance movements of the laser focus F as shown in FIGS. 2A 2C in a monolithic glass block. As shown in FIGS. 3A-3C, both the continuous and the step-by-step movement of the laser focus F in the beam direction 12 result in a vertical weld seam 13 which is formed from solidification bubbles (which arise on account of local material densifications) or individual spot welds 14 and extends in the thickness direction D of the two workpieces 2 (as shown in FIG. 1). It should be emphasized here that an individual spot weld 14 can also be placed through individual spot welds 14 that have already been produced beforehand. In FIG. 3B the respective next individual spot weld 14 is produced in the material still hot from the preceding individual spot weld 14, whereas in FIG. 3C the respective next individual spot weld 14 is produced in the material that has already cooled down owing to the temporal delay with respect to the preceding individual spot weld 14. No appreciable difference can be ascertained between the weld seam 13 in material processed hot (FIG. 3B) and in cooled-down material (FIG. 3C). As a result, the continuous movement and the step-by-step movement of the laser focus F in the beam direction 12 give rise to a vertical weld seam 13. In this case, bubbles 14 arise during the solidification of the weld seam 13 on account of rapid expansion and cooling. The bubbles 14 are not desired, but are difficult to prevent.

Figures 4A, 4B, 4C:
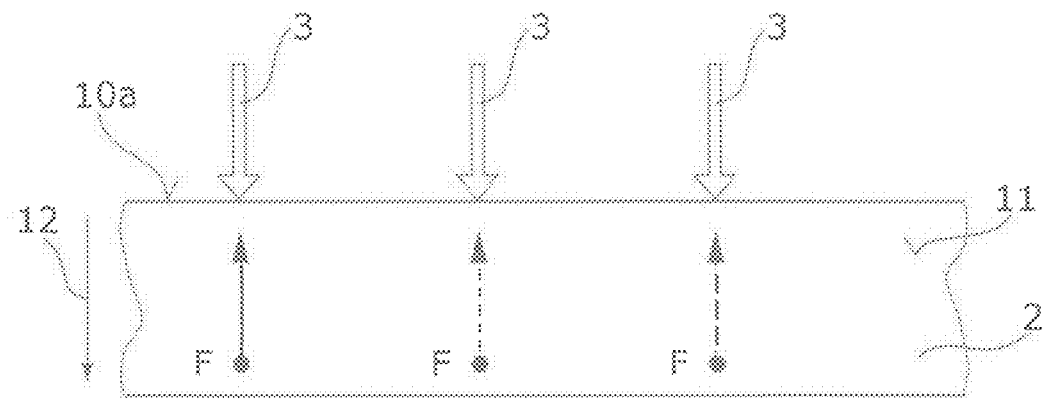
FIGS. 4A-4C are a series of schematic diagrams of different vertical advance movements of the laser focus counter to the beam direction of the laser beam during butt welding to produce a vertical weld seam, in a sectional view along the joining surface of the two laser-welded workpieces.

FIGS. 4A-4C schematically show different vertical advance movements of the laser focus F in the workpiece volume counter to the beam direction 12, wherein during this vertical advance movement of the laser focus F, the laser beam 3 is stationary relative to the two workpieces 2. In FIG. 4A the laser focus F is moved counter to the beam direction 12 continuously (e.g., at a vertical advance speed of 20 mm/s) and in FIGS. 4B, 4C said laser focus is moved step by step without pauses (FIG. 4B) and with a temporal pause (e.g., 2 seconds) between the steps (FIG. 4C).

Figures 5A, 5B, 5C:
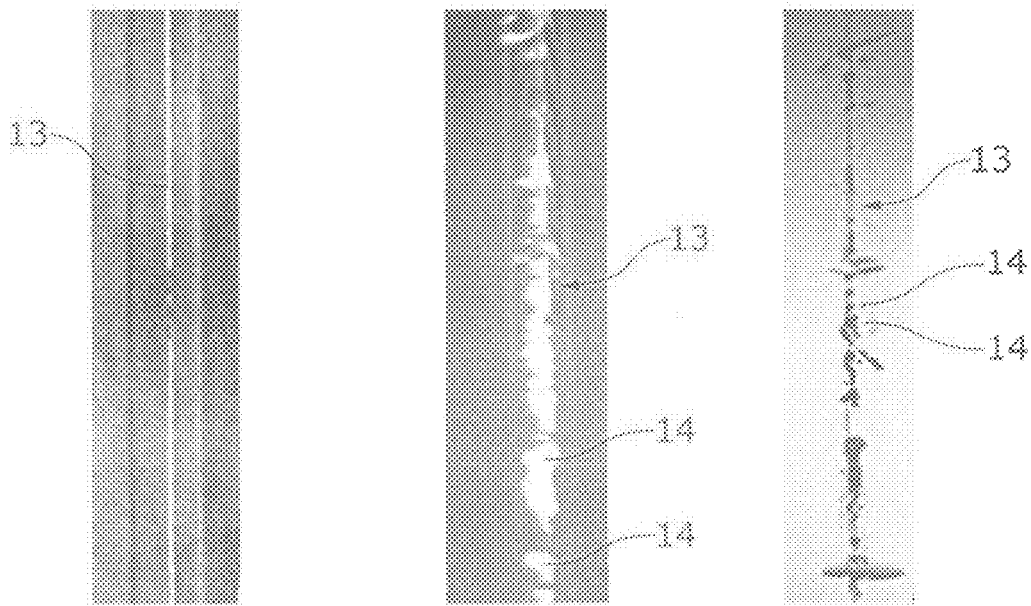
FIGS. 5A-5C are a series of photographs of vertical weld seams that were produced in a monolithic glass block with the vertical advance movements of the laser focus as shown in FIGS. 4A-4C.

FIGS. 5A-5C are photographs of vertical weld seams 13 produced by the vertical advance movements of the laser focus F as shown in FIGS. 4A-4C in a monolithic glass block. As shown in FIG. 5A, the continuous movement of the laser focus F counter to the beam direction 12 results in a continuous, vertical weld seam 13 without discernible solidification bubbles or individual spot welds. In FIG. 5B welding occurs in material still hot from the preceding step, and in FIG. 5C welding occurs in material that has already cooled down due to the temporal delay with respect to the preceding step. FIGS. 5B and 5C each show a vertical weld seam 13 interrupted by solidification bubbles 14 with distinct cracks along the entire weld seam 13. As a result, only the continuous movement of the laser focus F counter to the beam direction 12 gives rise to a continuous, crack-free vertical weld seam 13 extending in the thickness direction D of the two workpieces 2.

During the vertical advance movement of the laser focus F in or counter to the beam direction 12, the laser beam 3 can also be moved relative to the two workpieces 2 in an advance direction running parallel or transversely with respect to the joining line 15, e.g., by the laser processing head 8 being correspondingly moved in the X-direction and Y-direction. In this case, however, the focus speed at which the laser focus F is moved in or counter to the beam direction 12 should be greater than the advance speed at which the laser beam 3 is moved in the advance direction.

By the butt welding methods described above, for example, individual mirror elements 2 (e.g., for a linear optical system) can be joined together to form a large mirror by one or more vertical weld seams being placed along the joining line. Moreover, poor horizontal weld seams can be corrected by vertical weld seams that are placed through a horizontal weld seam. The weld seam can also have a circular shape or other freeform contour. It is also possible to weld slightly curved surfaces with slight movement in the X-direction during Z-welding.

Other Embodiments

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A method for butt welding two laser-transparent, workpieces composed of glass, the method comprising:
   obtaining first and second workpieces, wherein each workpiece comprises a top side, an underside, and side surfaces;
   moving a side surface of the first workpiece into contact with a side surface of the second workpiece to form a joining surface between the two workpieces;
   focusing at least one ultrashort pulse laser beam in a beam direction parallel to the joining surface of the two workpieces and focusing the at least one ultrashort pulse laser beam into a region of the joining surface to locally melt the two workpieces in the region of their joining surface, wherein the ultrashort pulse laser beam has a pulse duration of less than 500 picoseconds; and
   moving a laser focus of the ultrashort pulsed laser beam in or counter to the beam direction of the ultrashort pulse laser beam to produce in the region of the joining surface a butt weld seam that extends in the beam direction along an entire workpiece thickness at right angles or obliquely with respect to the top side of the two workpieces, and end before the top side and the underside.

2. The method of claim 1, wherein the laser focus is moved continuously or step-by-step in or counter to the beam direction.

3. The method of claim 2, wherein the laser focus is moved continuously at an advance speed of 0.5 mm/s to 100 mm/s in or counter to the beam direction.

4. The method of claim 2, wherein the laser focus is moved continuously at an advance speed of 5 mm/s to 30 mm/s in or counter to the beam direction.

5. The method of claim 2, wherein the laser focus is moved continuously at an advance speed of 20 mm/s in or counter to the beam direction.

6. The method of claim 1, wherein the weld seam has a seam diameter of 5 to 500 μm.

7. The method of claim 1, wherein the weld seam has a seam diameter of 50 to 100 μm.

8. The method of claim 1, wherein a transverse movement of the laser focus is also superimposed on an advance movement of the laser focus in or counter to a radiation direction of the ultrashort pulse laser beam.

9. The method of claim 1, wherein the ultrashort pulse laser beam comprises a laser pulse packet consisting of individual pulses.

10. The method of claim 9, wherein the individual pulses in the pulse packet are identical.

11. The method of claim 1, wherein a plurality of weld seams are produced at a distance from one another along a joining line of the two workpieces.

12. The method of claim 1, wherein during the movement of the laser focus in or counter to the beam direction, the ultrashort pulse laser beam is not moved transversely relative to the two workpieces.

13. The method of claim 1, wherein during an advance movement of the laser focus in or counter to the beam direction, the ultrashort pulse laser beam is moved relative to the two workpieces parallel or transversely with respect to a joining line of the two workpieces.

14. The method of claim 13, wherein a focus speed at which the laser focus is moved in or counter to the beam direction is greater than an advance speed at which the ultrashort pulse laser beam is moved parallel or transversely with respect to the joining line.

15. The method of claim 1, wherein the ultrashort pulse laser beam comprises laser radiation having pulse durations of from about 1 picosecond to less than about 50 picoseconds (ps).

16. An optical element composed of glass, comprising two individual parts that are laser-welded to one another according to the method of claim 1, wherein the two individual parts are laser-welded to one another by at least one weld seam extending in a thickness direction of the two individual parts.

17. The optical element of claim 16, wherein the weld seam extends at right angles or obliquely with respect to a surface of the optical element.

18. The optical element of claim 16, wherein the weld seam has a length of at least 50 μm.

19. The optical element of claim 16, wherein the weld seam is a continuous line or a repeatedly interrupted line.

20. The optical element of claim 16, wherein a plurality of weld seams extending in the thickness direction of the two individual parts are arranged at a distance from one another along the joining line of the two individual parts.

21. The optical element of claim 16, wherein the weld seam has a seam diameter of 5 to 500 μm.

* * * * *